United States Patent
Sridhar et al.

(10) Patent No.: US 9,952,832 B2
(45) Date of Patent: Apr. 24, 2018

(54) METHODS FOR GENERATING SMART ARCHTECTURE TEMPLATES AND DEVICES THEREOF

(71) Applicant: Wipro Limited, Bangalore (IN)

(72) Inventors: Kavitha Sridhar, Bangalore (IN); Udayakumar Kuppuswamy, Chennai (IN)

(73) Assignee: Wipro Limited, Bangalore (IN)

( * ) Notice: Subject to any disclaimer, the term of this patent is extended or adjusted under 35 U.S.C. 154(b) by 148 days.

(21) Appl. No.: 15/065,197

(22) Filed: Mar. 9, 2016

(65) Prior Publication Data

US 2017/0212729 A1 Jul. 27, 2017

(30) Foreign Application Priority Data

Jan. 22, 2016 (IN) .............................. 201641002564

(51) Int. Cl.
*G06F 9/44* (2018.01)
*G06Q 10/10* (2012.01)

(52) U.S. Cl.
CPC ............. *G06F 8/20* (2013.01); *G06Q 10/101* (2013.01)

(58) Field of Classification Search
CPC ....................................................... G06F 8/20
See application file for complete search history.

(56) References Cited

U.S. PATENT DOCUMENTS

| | | | |
|---|---|---|---|
| 6,651,240 B1 * | 11/2003 | Yamamoto ................ | G06F 8/24 717/104 |
| 9,104,997 B1 * | 8/2015 | Balasubramanian .. | G06Q 10/06 |
| 9,760,343 B2 * | 9/2017 | Noens ....................... | G06F 8/33 |
| 2006/0080638 A1 * | 4/2006 | Fiore ......................... | G06F 8/71 717/104 |
| 2007/0168910 A1 * | 7/2007 | Radford ............. | G06F 11/3616 717/101 |
| 2011/0055807 A1 * | 3/2011 | Mahajan .................. | G06F 8/61 717/107 |
| 2011/0119223 A1 * | 5/2011 | Lane ........................ | G06F 8/36 706/50 |

(Continued)

OTHER PUBLICATIONS

S. Yadav., et al., "Design of Rank Based Reusable Component Retrieval Algorithm", International Journal of Advanced Research in Computer Science and Software Engineering, Nov. 2013, vol. 3, Issue 11, pp. 1-8, <www.jarcsse.com>.

*Primary Examiner* — Philip Wang
(74) *Attorney, Agent, or Firm* — LeClairRyan PLLC

(57) ABSTRACT

A method, non-transitory computer readable medium, and a template management computing device that assists with generating smart architecture templates includes identifying one or more technical keywords from received data associated with one or more business requirements by comparing the received data associated with the one or more business requirements against information stored in a technical keyword database. Next, one or more template configuration files are identified based on the identified one or more technical keywords. The architecture template is generated for the received data associated with the one or more business requirements using the determined one or more template configuration files. The generated architecture template is provided wherein the provided application is template is ready to be deployed in a development and a testing environment.

12 Claims, 7 Drawing Sheets

(56) References Cited

U.S. PATENT DOCUMENTS

| | | | |
|---|---|---|---|
| 2015/0186507 A1* | 7/2015 | Pawar | G06F 17/30731 |
| | | | 707/739 |
| 2015/0242410 A1* | 8/2015 | Pattabhiraman | G06Q 10/06 |
| | | | 707/728 |
| 2016/0154629 A1* | 6/2016 | Noens | G06F 8/30 |
| | | | 717/107 |
| 2017/0177314 A1* | 6/2017 | Powers | G06F 8/52 |
| 2017/0212729 A1* | 7/2017 | Sridhar | G06F 8/20 |
| 2017/0220323 A1* | 8/2017 | Dsouza | G06F 7/552 |

\* cited by examiner

Business requirements: Restaurant, Stores, Railway Station, Banks, Airport, Repository, Storage, Transactions, Private, Public Offline, Online, Central, Client, Hybrid Facebook, LinkedIn, Gmail External, Interface, Connections, third party systems Connection, Storage, Repository, Data Management Concurrent Users Automatic email Notification

FIG. 5

Extracted Keywords:
Restaurant, Transactions, Public Online Facebook, Gmail Storage Concurrent Users Automatic email Notification

FIG. 6

METHODS FOR GENERATING SMART
ARCHITECTURE TEMPLATES AND
DEVICES THEREOF

This application claims the benefit of Indian Patent Application Filing 201641002564, filed Jan. 22, 2016, which is hereby incorporated by reference in its entirety.

FIELD

This technology generally relates to data management, more particularly, to methods for generating smart architecture templates and devices thereof.

BACKGROUND

Traditionally applications are developed based on the keywords manually identified by the technology architect from the business requirements. These manually identified keywords are then translated to an architecture diagram based on prior experience of the technology architect. Finally the architecture diagram is used as the foundation to develop an application. Therefore, it is extremely important to have an architecture diagram as close to the business requirement as possible.

However, as illustrated above, the prior technologies require the architecture diagram to be manually developed. Unfortunately, the architecture manually developed is not close the business requirements because it often includes human errors. Additionally, these manually developed architecture diagrams fails to include additional data associated with building the application and how the various layers and components interact and work with each other to develop the application.

SUMMARY

A method for generating smart architecture templates generating an architecture template includes identifying, by a template management computing device, one or more technical keywords from received data associated with one or more business requirements by comparing the received data associated with the one or more business requirements against information stored in a technical keyword database. Next, one or more template configuration files are identified by the template management computing device based on the identified one or more technical keywords. The architecture template is generated by the template management computing device for the received data associated with the one or more business requirements using the determined one or more template configuration files. The generated architecture template is provided by the template management computing device wherein the provided application is template is ready to be deployed in a development and a testing environment.

A non-transitory computer readable medium having stored thereon instructions for generating smart architecture templates comprising machine executable code which when executed by at least one processor, causes the processor to perform steps including identifying one or more technical keywords from received data associated with one or more business requirements by comparing the received data associated with the one or more business requirements against information stored in a technical keyword database. Next, one or more template configuration files are identified based on the identified one or more technical keywords. The architecture template is generated for the received data associated with the one or more business requirements using the determined one or more template configuration files. The generated architecture template is provided wherein the provided application is template is ready to be deployed in a development and a testing environment.

A template management computing device comprising a processor, a memory, wherein the memory coupled to the processor which is configured to execute programmed instructions stored in the memory includes identifying one or more technical keywords from received data associated with one or more business requirements by comparing the received data associated with the one or more business requirements against information stored in a technical keyword database. Next, one or more template configuration files are identified based on the identified one or more technical keywords. The architecture template is generated for the received data associated with the one or more business requirements using the determined one or more template configuration files. The generated architecture template is provided wherein the provided application is template is ready to be deployed in a development and a testing environment.

This technology provides a number of advantages including providing more effective methods, non-transitory computer readable medium and devices for generating smart architecture templates. Using the technology disclosed herein, the architecture templates are generated automatically from the business requirements without human intervention. Additionally, the architecture diagram generated using the techniques that will be further illustrated below, also includes data associated with building the application from the architecture template and how the various layers and components interact and work with each other to develop the application.

BRIEF DESCRIPTION OF THE DRAWINGS

FIG. 5 is an exemplary business requirement data received from client computing device;

FIG. 6 is an exemplary illustration of the keywords identified from the business requirements;

DETAILED DESCRIPTION

Figure 1:
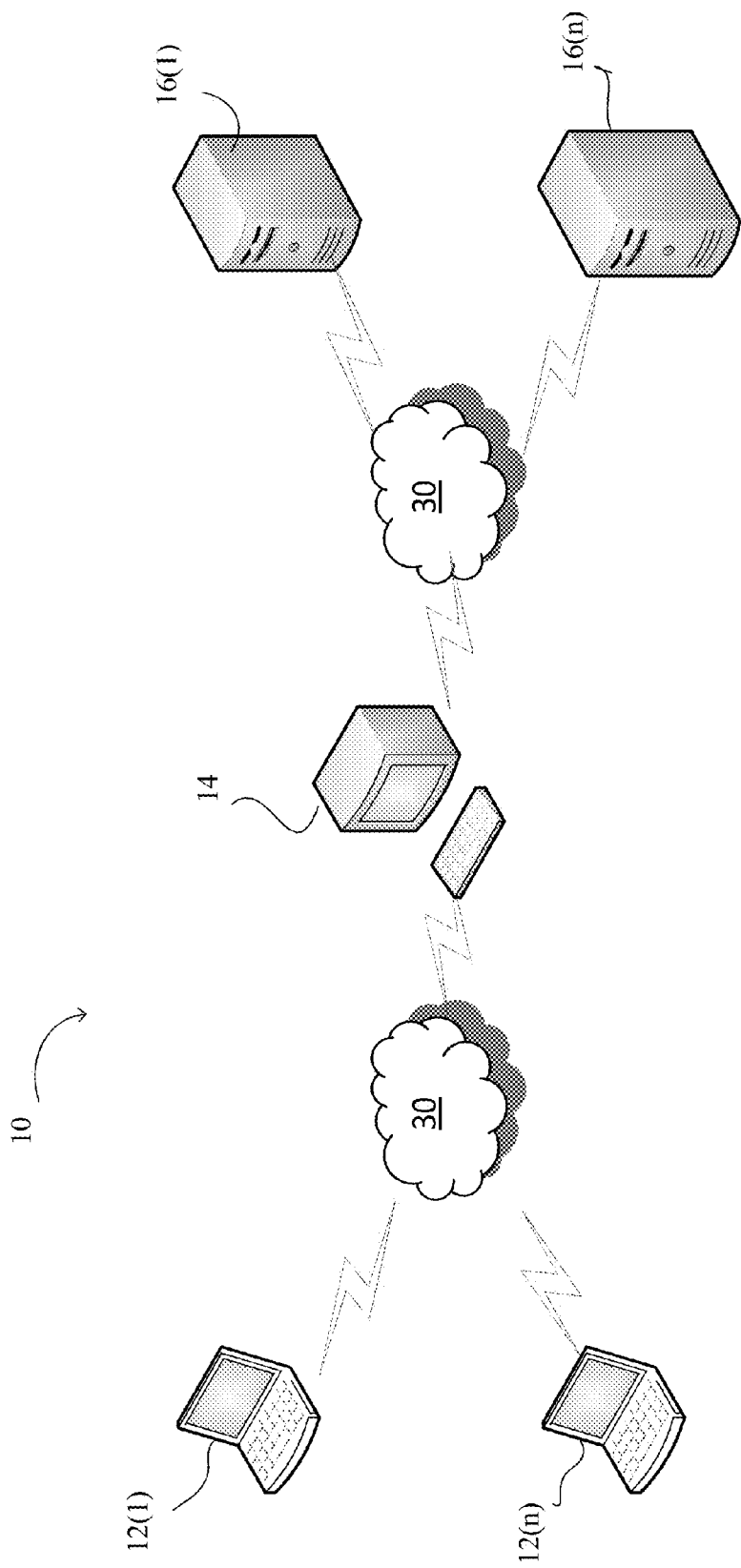
FIG. 1 is a block diagram of an exemplary template management computing device for generating smart architecture templates.
Figure 2:
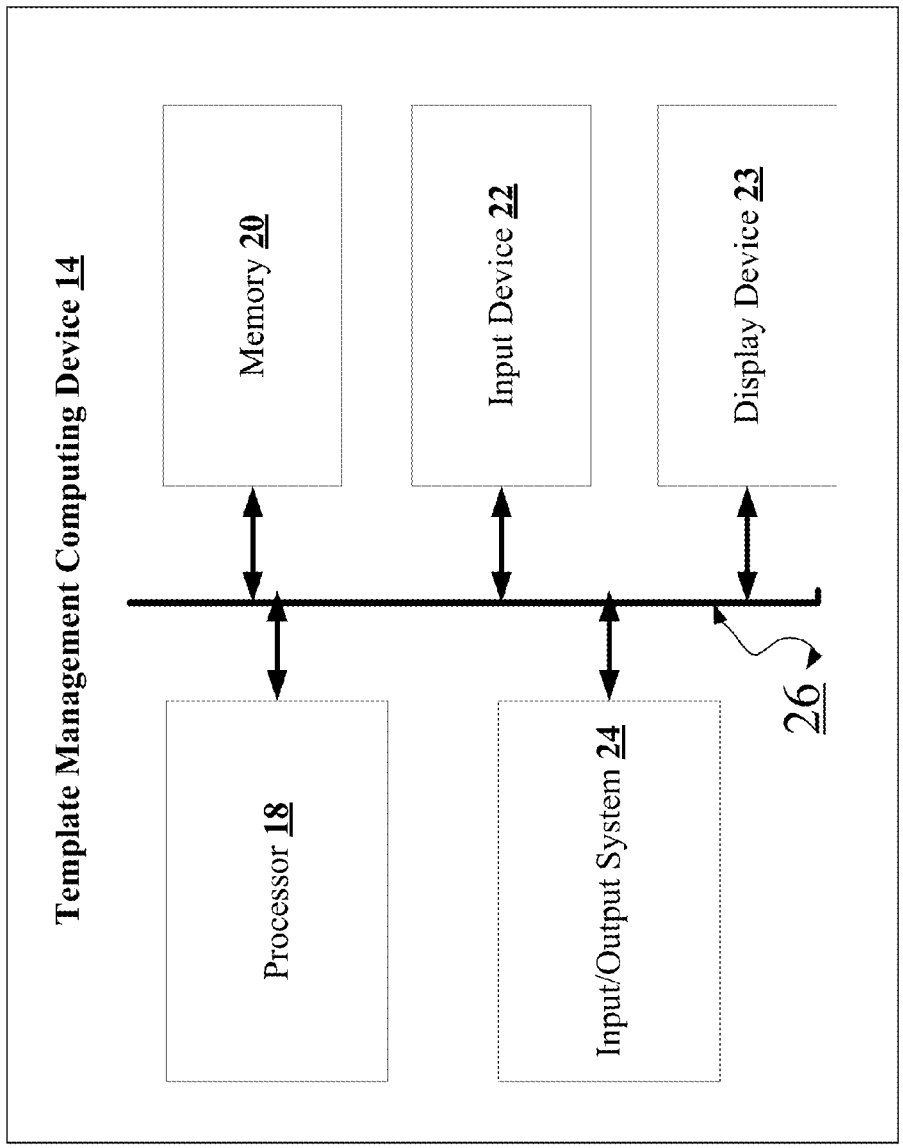
FIG. 2 is an exemplary functional block diagram of the template management computing device.

An exemplary environment 10 including a plurality of client computing devices 12(1)-12(n), a template management computing device 14 and a plurality of data sources 16(1)-16(n) for generating smart architecture templates is illustrated in FIG. 1. The exemplary environment 10 includes plurality of client computing devices 12, the template management computing device 14, and which are coupled together by a communication network 30, although the environment can include other types and numbers of devices, components, elements, and communication networks 30 in other topologies and deployments. While not shown, the exemplary environment 10 may include additional components, such as database etc, which are well known to those of ordinary skill in the art and thus will not be described here. This technology provides a number of advantages including providing more effective methods, non-transitory computer readable medium and devices for generating smart architecture templates.

The template management computing device 14 assists with generating smart architecture templates as illustrated and described with the examples herein, although template management computing device 14 may perform other types and numbers of functions. The template management computing device 14 includes at least one CPU/processor 18, memory 20, input device 22A and display device 22B, and interface device 24 which are all coupled together by bus 26, although template management computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 3:
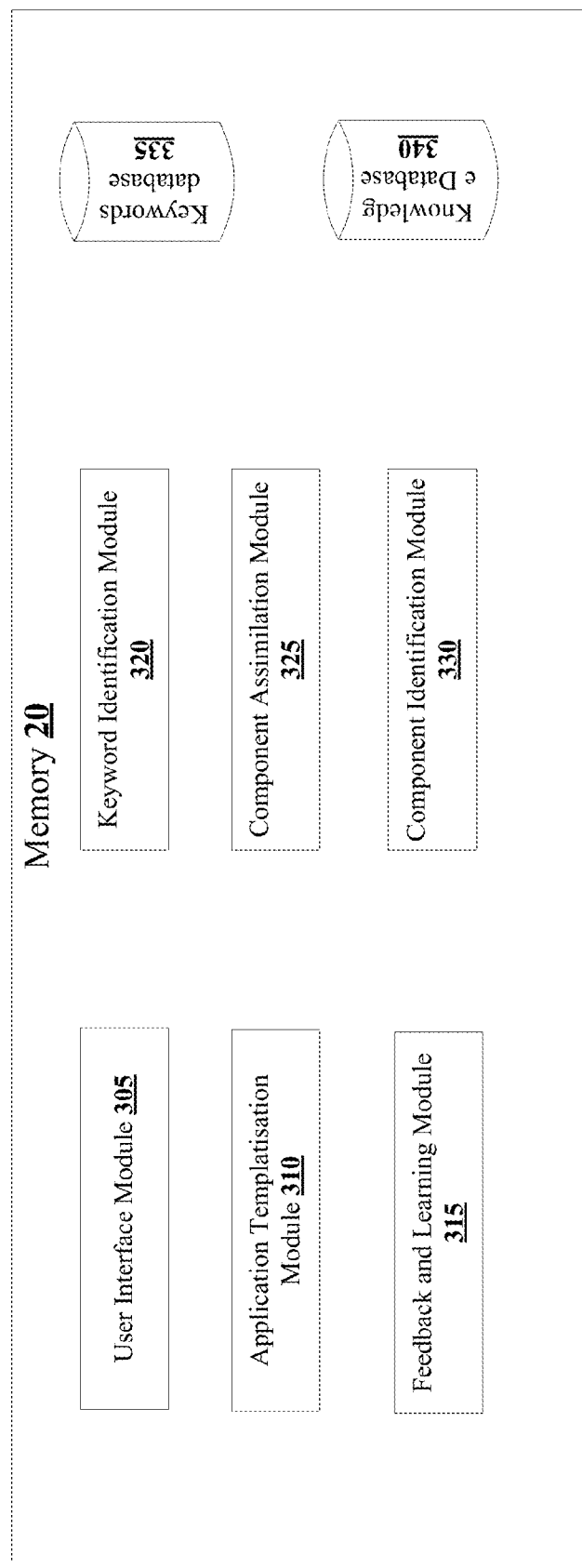
FIG. 3 is an exemplary data flow diagram of the modules within a memory of the template management computing device.
Figure 4:
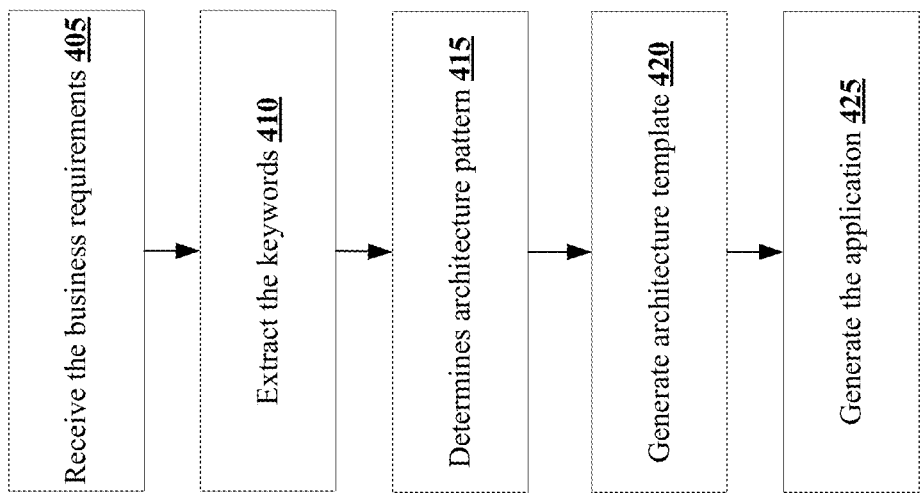
FIG. 4 is an exemplary flowchart illustrating a method for generating smart architecture templates.

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 4 is representative of example steps or actions of this technology that may be embodied or expressed as one or more non-transitory computer or machine readable instructions stored in memory 20 that may be executed by the processor(s) 18. Additionally, as illustrated in FIG. 3, memory 20 includes a user interface module 305, an application templatisation module 310, feedback and learning module 315, keyword identification module 320, component assimilation module 325, component identification module 320, keywords database 335, and the knowledge database 340, although the memory 20 can include other types or amounts of modules.

In this example, the user interface module 305 assists with selection of mode to get access to business requirement. By way of example only, the two available modes are online mode and offline mode. In this example, the online mode relates to integrating with requirement management tools and business requirements that uploaded in the form of excel or word documents through offline mode. Next, the application templatisation module 310 assists with updating configuration files and base code for the various module to work together, although the application templatisation module 310 can perform other types or amounts of functions. Next, the feedback and learning module 315 assists with providing the user interface to seek feedback and enhance keyword database 335 and knowledge database 340, although the feedback and learning module 315 can assist with other types or amounts of functions. Next, the keyword identification module 320 assists with parsing the text in business requirement against the keyword database 335 and extracts the keyword, although the keyword identification module 320 can perform other types or amounts functions. Further, the component assimilation module 325 assists with obtaining the code from various sources and grouping them together, although the component assimilation module 325 can perform other types or amounts of functions. Furthermore, the component identification module 330 assists with executing the algorithm that processes the keywords with knowledge database 340 and provide list of optimal components identified. By way of example, the component identification module 330 identifies keywords like web based portal, secured, tables, mobiles, and laptops, desktop, view, and search, although the component identification module 330 can identify other types or numbers of keywords from the business requirements. Additionally, the component identification module 330 installs development tools such as static analysis tools, unit testing tools, profiling tools, etc. and configures them in the development environment. Next, the keywords database 335 includes keywords that are to be looked at while parsing, although the keywords database 335 can include other types or amounts of information. Next, the knowledge database 340 includes mapping of keywords to tools/framework/libraries and source from when they can be fetched, although the knowledge database 340 can include other types or amounts of information.

Input device 22A enables a user, such as a programmer or a developer, to interact with the template management computing device 14, such as to input and/or view data and/or to configure, program and/or operate it by way of example only. By way of example only, input device 22A may include one or more of a touch screen, keyboard and/or a computer mouse.

The display device 22B enables a user, such as an administrator, to interact with the template management computing device 14, such as to input and/or view data and/or to configure, program and/or operate it by way of example only. By way of example only, the display device 22B may include one or more of a CRT, LED monitor, or LCD monitor, although other types and numbers of display devices could be used.

The interface device 24 in the template management computing device 14 is used to operatively couple and communicate between the template management computing device 14, the plurality of client computing devices 12(1)-12(n) and the plurality of data sources 16(1)-16(n), although other types and numbers of systems, devices, components, elements and/or networks with other types and numbers of connections and configurations can be used. By way of example only, the template management computing device 14 can interact with other devices via a communication network 30 such as Local Area Network (LAN) and Wide Area Network (WAN) and can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other types of buses and/or other links may be used, such as PCI.

Each of the plurality of client computing devices 12(1)-12(n) includes a central processing unit (CPU) or processor, a memory, an interface device, input device and display device, which are coupled together by a bus or other link, although each could have other types and numbers of elements and/or other types and numbers of network devices could be used in this environment. The client computing device 12(1)-12(n), in this example, may run interface applications that may provide an interface to request for generating smart architecture templates.

The network environment 10 also includes plurality of data sources 16(1)-16(n). Each of the plurality of data sources 16(1)-16(n) includes a central processing unit (CPU) or processor, a memory, an interface device, and an I/O system, which are coupled together by a bus or other link, although other numbers and types of network devices could be used. Each of the plurality of data sources 16(1)-16(n) communicate with the template management computing device 14 through communication network 30, although the plurality of data sources 16(1)-16(n) can interact with the template management computing device 14 by other techniques. Various network processing applications, such as CIFS applications, NFS applications, HTTP Web Server applications, and/or FTP applications, may be operating on the plurality of data sources 16(1)-16(n) and transmitting content (e.g., files, Web pages) to the plurality of client computing devices 12(1)-12(n) or the template management computing device 14 in response to the requests.

It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as then the non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for generating smart architecture templates will now be described with reference to FIGS. 1-8. This example begins at step 405 where the template management computing device 14 receives business requirements from one of the plurality of client computing devices 12(1)-12(n), although the template management computing device 14 can receive other types or amounts of information along with the business requirements from the plurality of client computing devices 12(1)-12(n). In this example, the business requirements relates to data associated with building an application or an architecture template. By way of example, the business requirements can relate to a business associated with a retail store, although other types of business requirements can also be received in other examples. Alternatively in another example, the template management computing device 14 can obtain the business requirements from the plurality of data sources 16(1)-16(n), although the template management computing device 14 can obtain the business requirements from other memory locations. By way of example, FIG. 5 illustrates a portion of the received business requirements.

Next in step 410, the template management computing device 14 extracts one or more keywords from the received business requirements. In this example, the template management computing device 14 parses the received business requirements and compares each word of the received business requirements against the keywords database 335. When the word present in the received business requirements is also present in the keywords database 335, then the template management computing device 14 identifies that word as one of the keywords in the business requirements. Similarly, the template management computing device 14 scans the entire data received in the business requirements to identify the keywords. Additionally, the template management computing device 14 can also determine whether a word in the received business requirement is a keyword by identifying when there is an application interface that has the same name of the word that was parsed from the business requirements. By way of example, the keywords identified by the template management computing device 14 from the business requirements are illustrated in FIG. 6. Using this technique, the technology disclosed is able to accurately identify the keywords necessary to generate the architecture template.

Next in step 415, the template management computing device 14 determines architecture pattern based on identified one or more keywords for the received business requirement. In this example, the architecture pattern relates to template configuration files associated with the layered architecture and distributed web applications that are required generate the smart architecture template and also the application as per the received business requirements. By way of example, if the business requirement indicates that an online web application is required to be developed, then the architecture pattern can include the number of layers required for a login framework, format of a HTML page, data associated with the presentation and data access layer, although the architecture pattern can include other types or amounts of information. Additionally, the architecture pattern would also include data associated with connecting the various layers to generate the application in the received business requirement. Additionally in this example, the template management computing device 14 can modify the template configuration files to by changing the settings in the configuration files based on the identified keywords to make the template configuration files very specific to the business requirements.

Figure 7:
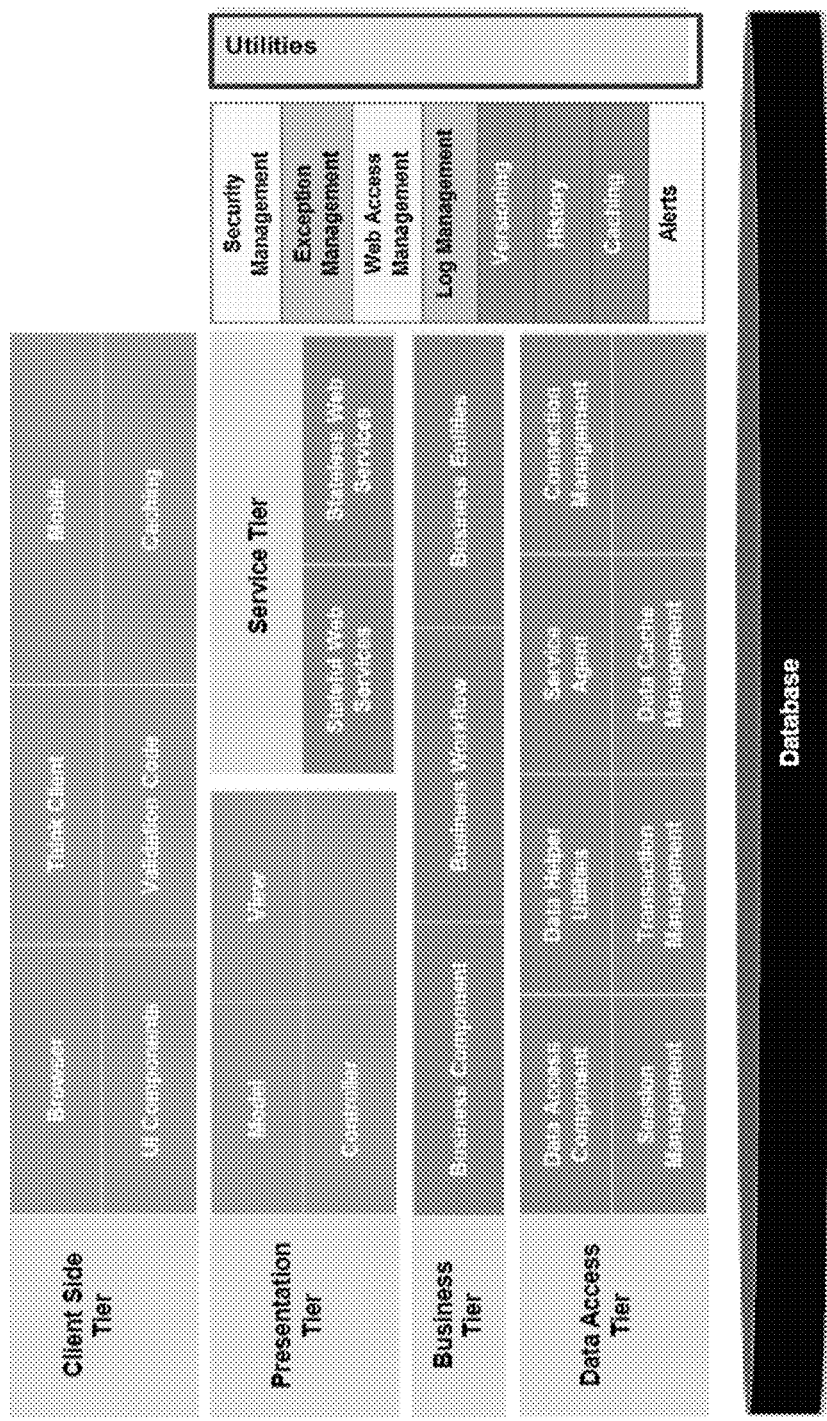
FIG. 7 is an exemplary illustration of the generated architecture template.
Figure 8:
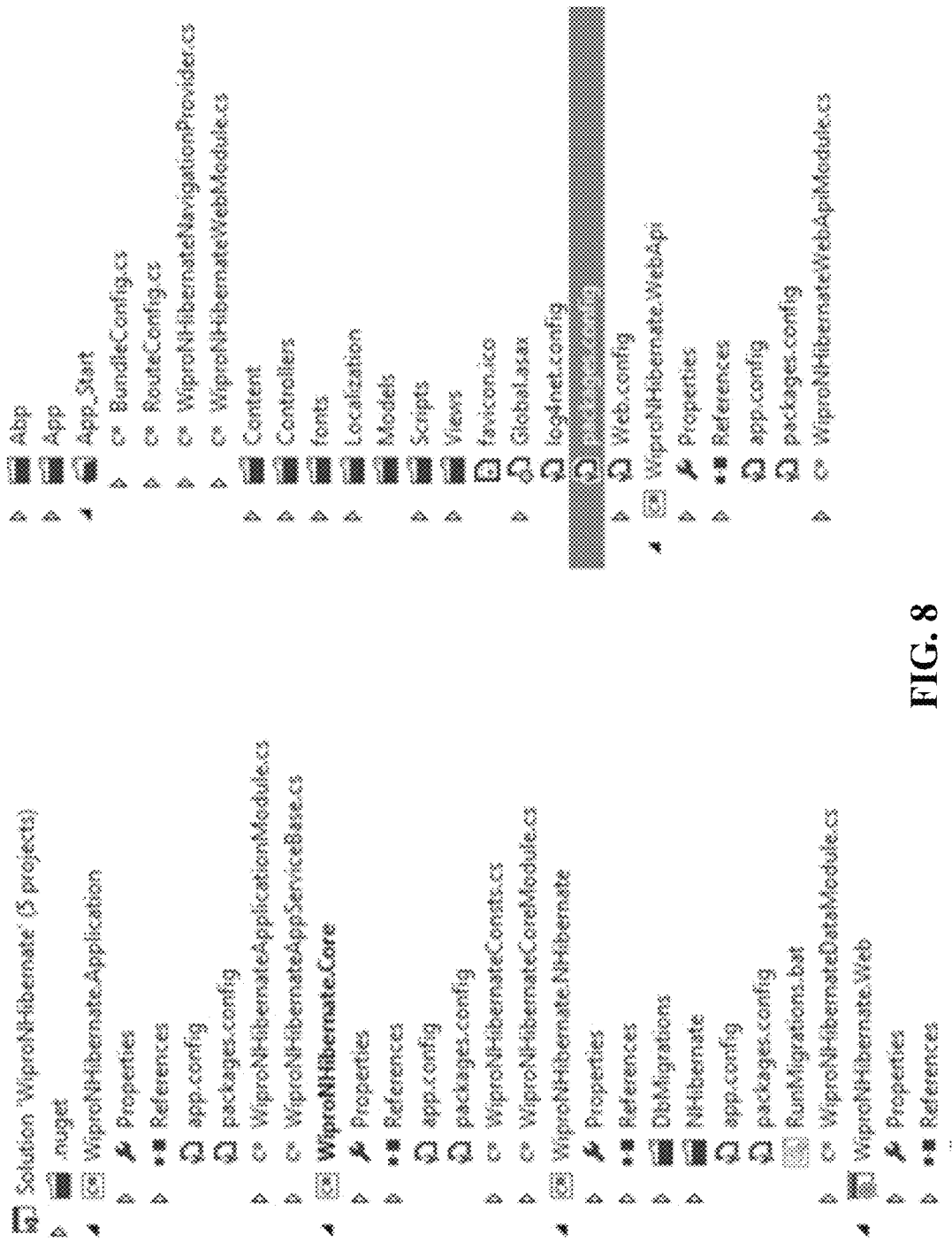
FIG. 8 is an exemplary illustration of software code obtained based on the architecture template.

Next in step 420, the template management computing device 14 generates the architecture template based on the identified architecture pattern. In this example, the architecture template relates to a graphical representation of the architecture pattern and how the various layers and components in the architecture pattern interact with each other. By way of example, FIG. 7 illustrates an exemplary architecture template. Additionally, the architecture template also includes data associated with the logical arrangement of the layers and the protocols that are used to communicate data between the layers and the components, although the architecture template can include other types or amounts of information. Additionally in this example, the template management computing device 14 also obtains the software code associated with the various layers and components represented in the generated architecture template and integrate the obtained software code in a code repository, although the template management computing device 14 can store the obtained code at other locations. By way of example, FIG. 8 illustrates the software code that is obtained for various layers represented in the architecture template.

In step 425, the template management computing device 14 generates the application based on the generated architecture template. In this example, the template management computing device 14 first generates one or more build scripts for the generated architecture template by resolving the dependencies and conflicts in the obtained code that was stored in the code repository, although the template management computing device 14 can perform other types or amounts of operations on the obtained code to generate the build scripts. These generated build scripts once executed results in the application being generated based on the initial set of business requirements that were received.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for automatically generating architecture templates to facilitate development of applications having improved correlation with business requirements, the method implemented by one or more template management computing devices and comprising:

identifying one or more technical keywords from received business requirement data by comparing the received business requirement data against information stored in a technical keyword database;

identifying an architecture pattern based on the identified technical keywords;

automatically generating an architecture template for the received business requirement data using the identified architecture pattern, wherein the generated architecture template comprises a plurality of components; and generating one or more build scripts based on obtained software code corresponding to the components of the architecture template and executing the generated build scripts to generate an application.

2. The method as set forth in claim 1 further comprising modifying one or more settings in template configuration files associated with the architecture pattern based on the identified technical keywords from the received business requirement data.

3. The method as set forth in claim 2 wherein the architecture template is further generated based on the modified template configuration files.

4. The method as set forth in claim 1 further comprising identifying the architecture pattern correlated to the identified technical keywords.

5. A template management computing device comprising a processor coupled to memory comprising programmed instructions stored thereon, wherein the processor is configured to execute the stored programmed instructions to:

identify one or more technical keywords from received business requirement data by comparing the received business requirement data against information stored in a technical keyword database;

identify an architecture pattern based on the identified technical keywords;

automatically generate an architecture template for the received business requirement data using the identified architecture pattern, wherein the generated architecture template comprises a plurality of components; and generate one or more build scripts based on obtained software code corresponding to the components of the architecture template and execute the generated build scripts to generate an application.

6. The device as set forth in claim 5 wherein the processor is further configured to execute the stored programmed instructions to modify one or more settings in template configuration files associated with the architecture pattern based on the identified technical keywords from the received business requirement data.

7. The device as set forth in claim 6 wherein the architecture template is further generated based on the modified template configuration files.

8. The device as set forth in claim 5 wherein the processor is further configured to execute the stored programmed instructions to identify the architecture pattern correlated to the identified technical keywords.

9. A non-transitory computer readable medium having stored thereon instructions for automatically generating architecture templates to facilitate development of applications having improved correlation with business requirements, the instructions comprising machine executable code which when executed by at least one processor, causes the processor to:

identify one or more technical keywords from received business requirement data by comparing the received business requirement data against information stored in a technical keyword database;

identify an architecture pattern based on the identified technical keywords;

automatically generate an architecture template for the received business requirement data using the identified architecture pattern, wherein the generated architecture template comprises a plurality of components; and generate one or more build scripts based on obtained software code corresponding to the components of the architecture template and execute the generated build scripts to generate an application.

10. The medium as set forth in claim 9 wherein the machine executable code, when executed by the processor, further causes the processor to modify one or more settings in template configuration files associated with the architecture pattern based on the identified technical keywords from the received business requirement data.

11. The medium as set forth in claim 10 wherein the architecture template is further generated based on the modified template configuration files.

12. The medium as set forth in claim 9 wherein the machine executable code, when executed by the processor, further causes the processor to identify the architecture pattern correlated to the identified technical keywords.

* * * * *